(12) United States Patent
Calvimontes et al.

(10) Patent No.: US 8,964,188 B2
(45) Date of Patent: Feb. 24, 2015

(54) METHOD AND APPARATUS FOR DETERMINING THE SURFACE TOPOGRAPHY OF COATED REFLECTIVE SURFACES

(75) Inventors: Alfredo Calvimontes, Dresden (DE); Kay Lederer, Dresden (DE)

(73) Assignees: Leibniz-Institut fur Polymerforschung Dresden E.V., Dresden (DE); Plastic Logic Limited, Cambridge (GB)

( * ) Notice: Subject to any disclaimer, the term of this patent is extended or adjusted under 35 U.S.C. 154(b) by 102 days.

(21) Appl. No.: 13/524,210

(22) Filed: Jun. 15, 2012

(65) Prior Publication Data
US 2013/0038861 A1 Feb. 14, 2013

(30) Foreign Application Priority Data
Jun. 15, 2011 (DE) .......................... 10 2011 077 567

(51) Int. Cl.
G01B 9/02 (2006.01)
G01B 11/24 (2006.01)
G01B 11/06 (2006.01)
G01B 11/30 (2006.01)

(52) U.S. Cl.
CPC ............ G01B 11/0675 (2013.01); G01B 11/24 (2013.01); G01B 11/0625 (2013.01); G01B 11/30 (2013.01); G01B 2210/50 (2013.01)
USPC ............................. 356/511; 358/600; 358/601

(58) Field of Classification Search
USPC .................... 356/511, 600–601, 73; 427/8–10
See application file for complete search history.

(56) References Cited

U.S. PATENT DOCUMENTS 3,620,814 A * 11/1971 Clark et al. ...................... 427/10
5,856,871 A 1/1999 Cabib et al.
7,324,210 B2 1/2008 De Groot et al.

FOREIGN PATENT DOCUMENTS

DE WO2006042696 A * 4/2006
DE 10 2010 016 462 A1 10/2011

(Continued)

OTHER PUBLICATIONS

Kossivas et al. Interferometry-Research and Applications in Science and Technology 2012, CCBY, pp. 361-376.*

(Continued)

*Primary Examiner* — Nimeshkumar Patel
*Assistant Examiner* — Brenitra M Lee
(74) *Attorney, Agent, or Firm* — Sughrue Mion, PLLC

(57) ABSTRACT

The invention relates to the field of measurement technology and concerns a method and an apparatus, such as may be used, by way of example, in thin-layer technology for organic dielectric semi-conducting or conducting layers on substrates.
The object of the invention is to indicate a method and an apparatus with which both the surface topography of the coating and that of the surface may be determined independently of one another, at the same position.
The object is achieved by a method wherein the three-dimensional topography of the coating is determined using chromatic white light measurement and, subsequently, the thickness of the coating is determined using UV interferometry, and the surface topography of the coated surface is determined by a comparison with the overall dimensions of the coated surface.
The object is further achieved by an apparatus wherein an apparatus for chromatic white light measurement and an apparatus for UV interferometry are disposed on a test bench.

7 Claims, 4 Drawing Sheets

(56) References Cited

FOREIGN PATENT DOCUMENTS

| EP | 1 805 477 A | 7/2007 |
|---|---|---|
| WO | WO 2006042696 A1 * | 4/2006 |

OTHER PUBLICATIONS

J.C. Anderson, Theory of the Thin Film Transistor, Thin Solid Films, Jun. 4, 1976, pp. 151-161, vol. 38, Elsevier Sequoia S.A., Lausanne—Printed in Switzerland.

Antonio Facchetti et al., "Gate Dielectrics for Organic Field-Effect Transistors: New Opportunities for Organic Electronics", Advanced Materials, 2005, pp. 1705-1725, vol. 17, Wiley-VCH Verglag GmbH & Co. KGaA, Weinheim.

J.S.Hill, "Interferometric Thickness Measurements on Transparent Thin Films", J. Phys. D: Appl. Phys., 1971, pp. 741-748, vol. 4, Great Britain, <http://iopscience.iop.org/0022-3727/4/6/302>.

Seung-Woo Kim et al., "Thickness-Profile Measurement of Transparent Thin-Film Layers by white light scanning interferometry", Applied Optics, 1999, pp. 5968-5972, vol. 38, No. 28, Optical Society of America.

A.K. Ruprecht et al., "Chromatic confocal sensors for micro-topography measurements", 50. Internationales Wissenschaftiliches Kolloquium, 2005, pp. 257-258, Technische Universitat Ilmenau.

Aiko K. Ruprecht et al., "Chromatic Confocal Detection for High Speed Micro-Topography Measurements", 2004, pp. 53-60, SPIE vol. 5302, SPIE and IS&T.

H.M. Shabana, "Determination of Film Thickness and Refractive Index by Interferometry", Polymer Testing 23, 2004, pp. 695-702, Elsevier.

Kj Stout et al., "The Development of Methods for the Characterisation of Roughness in Three Dimensions", Publication No. EUR 15178 EN of the Commission fo the European Communities Disseminatio of Scientific and Technical Knowledge Unit, 1993, pp. 1-384, Printing Section, University of Birmingham Edgbaston, Birmingham, B15 2TT.

Janos Veres, et al., "Low-k Insulators as the Choice of Dielectrics in Organic Field-Effect Transistors", Advanced Functional Materials, Mar. 2003, vol. 13, No. 3, pp. 199-204, Wiley-VCH Verlag GmbH & Co. KGaA, Weinheim.

Katerina Zalamova, et al., "Smooth Stress Relief of Trifluoroacetate Metal-Organic Solutions for YBa2Cu3O7 Film Growth", Chem. Mater. 2006, 18, pp. 5897-5904, American Chemical Society.

Search Report issued in corresponding European Patent Application No. 12 171 156.8 dated Jun. 20, 2013.

Hirth, F., et al.; Depth-Sensitive Thin Film Reflectometer; Measurement Science and Technology; Bd. 21, Nr. 12, 22; Oct. 22, 2010.

Artigas, R. et al.; Dual-Technology Optical Sensor Head for 3D Surface Shape Measurements on the Micro and Nano-Scales; Proceeding of SPIE; Bd. 5457, 27; Apr. 27, 2004.

* cited by examiner

METHOD AND APPARATUS FOR DETERMINING THE SURFACE TOPOGRAPHY OF COATED REFLECTIVE SURFACES

The invention relates to the field of measurement technology and concerns a method and an apparatus for determining the surface topography of coated reflective surfaces, such as may be used, by way of example, in thin-layer technology for organic dielectric semi-conducting or conducting layers on substrates.

A method for determining film thickness using interferometric spectral imaging was disclosed in 1999 by Cabib et al. (U.S. Pat. No. 5,856,871 B). This method allows an image to be produced of the thickness of the film overlying a substrate. However, with this method, only information on film thickness at different coordinates can be determined, but no information can be obtained on the film and substrate topographies.

In 2008 a method for interferometry scanning for measuring thin film thicknesses and surfaces became known from De Groot et al. (U.S. Pat. No. 7,324,210 B2). This method affords the possibility of scanning low-coherence interferometry data for at least one spatial position of a test specimen having multiple interfaces. Nevertheless, this method can only be applied to simultaneous measurements of film thickness and topography.

Unlike silicon-based semi-conductor devices, in which functional layers are generally inorganic and formed by vacuum deposition techniques, the application of polymer films in the case of OTFTs (Organic Thin Film Transistors), OLEDs (Organic Light Emitting Diodes) and OSCs (Organic Solar Cells), hereinafter generically designated as OEDs (Organic Electronic Devices), is effected by many different solvent-based techniques. The most frequent techniques include spin coating, spray coating, extrusion or slit-die coating, and printing. Vacuum deposition can also be used for polymer materials, but, due to the stability requirements at high temperatures under vacuum and at raised temperatures, it is restricted to a small number of compounds. The production of organic electronic devices includes the application of thin polymer films that serve as dielectric layers in an OED (A. Facchetti et al: Advanced Materials 2005, 17, 1705-1725). The thickness and material composition of such dielectric layers determine the capacity of the layer, a parameter that is critical in determining the parameters of a thin film transistor (J. C. Anderson, Thin Solid Films 1976, 38, 151-161). The capacity of a dielectric layer (FIG. 2) is defined by the following equation:

$$C = \epsilon_0 \epsilon_r \cdot A/d \qquad (1)$$

Where d is the distance between the capacitor plates, corresponding to the thickness of the dielectric layer, A the area of the capacitor plates and $\epsilon_0$ the absolute dielectric constant of the vacuum ($\epsilon_0 = 8.8 \cdot 10^{-12}$ As(Vm)$^{-1}$). The material characteristics of the dielectric layer are contained in the relative dielectric constant $\epsilon_r$ of the dielectric layer, frequently designated in the semi-conductor industry by κ. Materials with a high κ value (greater $\epsilon_r$) afford the possibility of a thinner dielectric layer on a transistor at constant capacity, or a reduction of the leak currents at constant thickness. Materials with a low κ value (smaller $\epsilon_r$) are used as insulators between conductor paths and reduce parasitic capacitances (J. Veres et al: Advanced Functional Materials 2003, 13-3, 199-204).

The two parameters d and $\epsilon_r$ determine the dielectric properties of the functional polymer layer. $\epsilon_r$ is a function of the frequency and, in the frequency range of visible light (~550 THz), is based on the index of refraction and the magnetic permeability $\mu_r$ by means of, in particular, the following equation:

$$n^2 = \mu_r \cdot \epsilon_r \qquad (2)$$

For optically transparent layers $\mu_r = 1$, the approximation $\epsilon_r = n^2$ may therefore be supposed. The parameters which describe the homogeneity of the dielectric polymer layer can thereby be reduced to n, d and the parameters for surface roughness.

Interferometry has been used to describe the thickness profile of transparent organic polymer films (S. W. Kim et al: Applied Optics 1999, 38-28, 5968-5973; H. W. Shabana, Polymer Testing 2004, 23, 695-702; J. S. Hill, J. Phys. D: Appl. Phys. 1971, 4, 741-747), but it can only measure the product derived from n*d. The surface topography of dielectric films and d have been described by a number of techniques which include AFM, SEM and TEM (K. Zalamova et al: Chem. Mater. 2006, 18, 5897-5906). These techniques provide very high resolution indication of the surface characteristics, but they have the disadvantage that they can only scan in very small scale. In order to measure film thickness, the index of refraction and the data relating to surface roughness on a μm$^2$ scale (S. W. Kim et al: Applied Optics 1999, 38-28, 5968-5973; H. W. Shabana, Polymer Testing 2004, 23, 695-702; J. S. Hill, J. Phys. D: Appl. Phys. 1971, 4, 741-747), interferometry has been used.

High-quality production of OED devices includes roll-to-roll processing, also known as 'web' processing, reel-to-reel processing or R2R. This is the production of electronic devices directly on a reel of flexible plastic or metal foil substrate. The use of flexible substrates imposes a further challenge on the application of an organic dielectric film, namely, an additional roughness parameter in cm$^2$ scale, which is termed "meso-roughness". Deconvolution of "meso-roughness" from surface and micro-roughness, the change in thickness and the change in material composition is extremely complex.

In order to allow for meso-roughness during production, it is desirable to determine the topography of the coated and uncoated surfaces.

By means of confocal scanning with chromatic white light, the topography of coated and uncoated surfaces may be determined. An apparatus for this is known prior art (MicroGlider-Fries Research & Technology GmbH, Deutschland).

Using this apparatus an object point is measured in each case, and, using (x-y) scanning, several of these object points can be reconstituted into an object field (www.stilsa.com). The apparatus uses a chromatic white light sensor (CWL) (FoRT-Bildung-Seminar, October 2008, Bergisch-Gladbach; www.Solarius.com), which is based on the principle of the chromatic aberration of light. White light is focused on the surface through a measuring head having a strongly wavelength-dependent focal distance (chromatic aberration). The spectrum of the diffused light on the surface generates a maximum value on the spectrometer. In conjunction with a calibration table, the wavelength of this maximum value indicates the distance from the sensor to the test specimen. The sensor functions on transparent, strongly reflective or smooth matt black surfaces (A. K. Ruprecht et al: 50$^{th}$ Internat. Scientific Colloquium, T U Ilmenau, October 2005; A. K. Ruprecht et al: Proc. SPIE—Int. Soc. Opt. 2004, 5360-61; www.micro-epsilon.com; www.frt-gmbh.com). It is extremely rapid and has practically no edge effects.

Also known prior art are methods and apparatuses which measure the film thickness on the coated surfaces. An apparatus for this purpose is an interferometric instrument of the company Fries Research & Technology GmbH, Germany. Using this apparatus a method is realized that enables non-contact high-resolution measurement of single or multiple layer films by means of superposition of light beams which are reflected at the edges of a thin film. The film thickness can be deduced from the evaluation of the spectral interference pattern of the superimposed light beams. This measured reflection spectrum is compared to a calculated spectrum in which the unknown thickness is systematically modified until both spectra match. This method renders possible measurement of both single layer and multiple layer films. The apparatus can work with different combinations of VIS and UV.

A disadvantage of the solutions known prior art is that the values that can be determined in accordance with known methods are not essentially measured simultaneously on one object and, in the case of coated surfaces, the topography of the substrate surface cannot be determined in addition to the topography of the coating.

The object of this invention is to indicate a method and an apparatus for determining the surface topography of coated reflective surfaces, by means of which, on a coated, reflective surface, both the surface topography of the coating and that of the coated, reflective surface may be determined essentially directly after one another, but independently of one another, at the same position.

The object is achieved by way of the invention stated in the claims. Advantageous embodiments are the subject of the sub-claims.

In the method in accordance with the invention for determining the surface topography of coated reflective surfaces, the three-dimensional topography of the coating is determined using chromatic white light measurement and, subsequently, the thickness of the coating is determined using UV interferometry, and the surface topography of the coated surface is determined by a comparison with the overall dimensions of the coated surface.

Advantageously, metal coated glass or polymer substrates are used as reflective surfaces.

Likewise advantageously, non-crosslinked or crosslinked polymers as polymer layers applied from solution are used as coatings.

Further advantageously, bisphenol-A based epoxides, polystyrene or polymethyl methacrylate are applied as polymer layers.

In the case of the apparatus in accordance with the invention for determining the surface topography of coated, reflective surfaces, an apparatus for chromatic white light measurement and an apparatus for UV interferometry are disposed on a test bench.

Advantageously, the apparatus for chromatic white light measurement is a chromatic white light sensor (CWL).

Further advantageously, the apparatus for UV inteferometry is a UV/VIS interferometer.

With the method in accordance with the invention and the apparatus in accordance with the invention, it becomes possible for the first time on a coated reflective surface to determine both the surface topography of the coating and that of the coated reflective surface at the same position essentially independently of one another.

In accordance with the invention, the layer parameter surface roughness can be determined from the dielectric layer thickness d and n, i.e. from the relative dielectric constant. The sub-division of the layer information into these individual parameters makes it possible to compare different application techniques for dielectric polymer layers for the production of OED devices.

The invention may be used in order to:
Determine the surface morphology, the topography and the coating conformity of thin organic dielectric, semi-conducting and conducting layers on reflective surfaces,
Deconvolute the roughness of the layer surface and of the surface subsurface (substrate subsurface), in order to obtain real images of the layer thickness,
Evaluate the actual layer thickness for longer lengths with a section length of up to 10 cm,
Evaluate the optical morphology of layer surfaces, i.e. the occurrence of Newton rings,
Examine the effect of heterogeneities of the surface on the resulting layer topography without direct measurement of the surface topography.

With the method in accordance with the invention and the apparatus in accordance with the invention, determination of the topography and of the actual layer thickness profile is effected in a measuring set-up at the same measurement station. It is based on a combination of chromatic confocal white light imaging (a three-dimensional topographic scan method) and UV/VIS interferometry, with the aim of obtaining real 3D maps of the layer topography and of the layer thickness, and, subsequently, of the surface topography of the subsurface surface, that is to say the surface of the coated reflective substrate.

Due to the thin layer thickness, coated substrates normally display considerable optical constructive and destructive interference (thin film interference). The effect can be easily recognized visually and on intensity maps as "Newton rings".

A CWL sensor uses the optical principle of the chromatic aberration of reflected light to determine the topography. A sudden change in the reflected VIS spectrum due to constructive or destructive interference could lead to an incorrect interpretation of the measured data. This undesirable phenomenon is particularly significant if destructive interference occurs. In this case the instrument software indicates cavities that are not present. Nevertheless, the original remains to all intents and purposes unchanged, as it is on a larger scale (meso-morphology).

To remove the interference effect of measured topographical data, a combination of mathematical operations has been applied (Stout, K. J. et al: Commission of the European Communities, Brussels-Luxembourg, 1993). The filtering took place in four successive steps:
(i) Removal of the waviness using FFT filtering in order to eliminate the occasional curvature of test specimens along the section length of 25 mm,
(ii) Correction of the plane to adapt it to the measured plane (the centre mean plane method was used),
(iii) Subarea extraction (zooming) of an area of 20 mm×20 mm, to eliminate the "border effect" due to the FFT filtering, and
(iv) Digital soft filtering of the data to eliminate the interference effect on the topographical data.

After removal of the interference rings using soft filtering, the original morphology remains unchanged. The topography that has been determined corresponds to the local maximum values of the original data.

The thin layer sensor is used to measure the layer thickness at programmed positions on the test specimen. The resulting data are compared with the topographical data which were previously obtained using chromatic confocal scanning at exactly the same x-y coordinates. This is possible because both the CWL sensor and the layer sensor are installed on the same scanning table.

By combining both measurement methods, the changes in the layer thickness along a defined section length can be determined and the topography of the coated surface (substrate) under the layer can be calculated.

Simultaneously to the topography measurement, the CWL sensor can also produce intensity maps of the reflected white light. By comparing the original topographical data, the intensity maps and the filtered topography, the optical morphology based on light interferences and the actual surface topography can be related to one another.

The invention offers the following advantages:
- It combines two methods for determining the topography and layer thickness of thin organic layers made of dielectrics, semi-conductors or conductors at one and the same measurement station.
- It enables visualization of the optical morphology of layer surfaces using intensity maps.
- It combines a method, a device configuration and a data evaluation algorithm for describing the meso-morphology of a layer surface separately from the surface morphology of the coated surface (substrate).
- It enables imaging of a larger surface area in the cm² (meso) range.

The invention will now be further elucidated by means of an illustrative embodiment.

Here,

ILLUSTRATION

Figure 1:
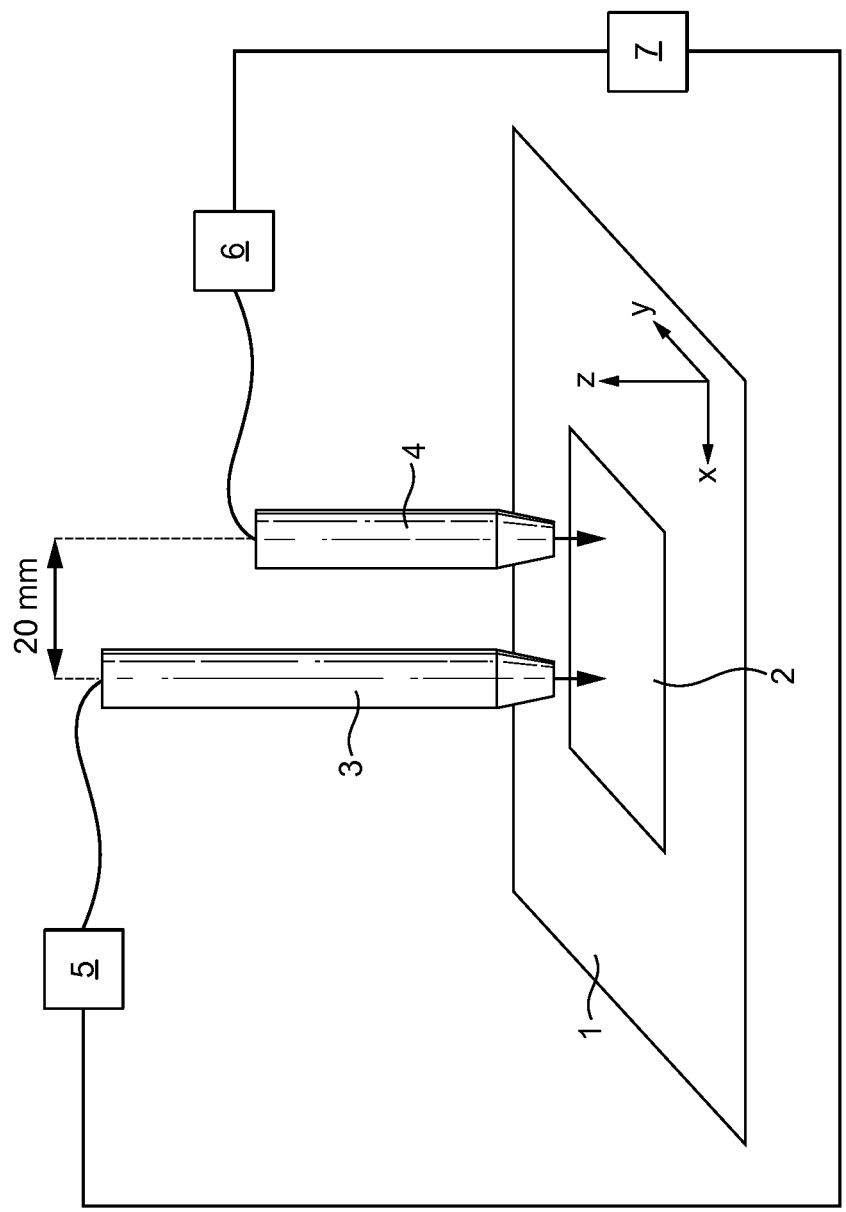
FIG. 1 is a schematic view of the apparatus in accordance with the invention
Figure 2:
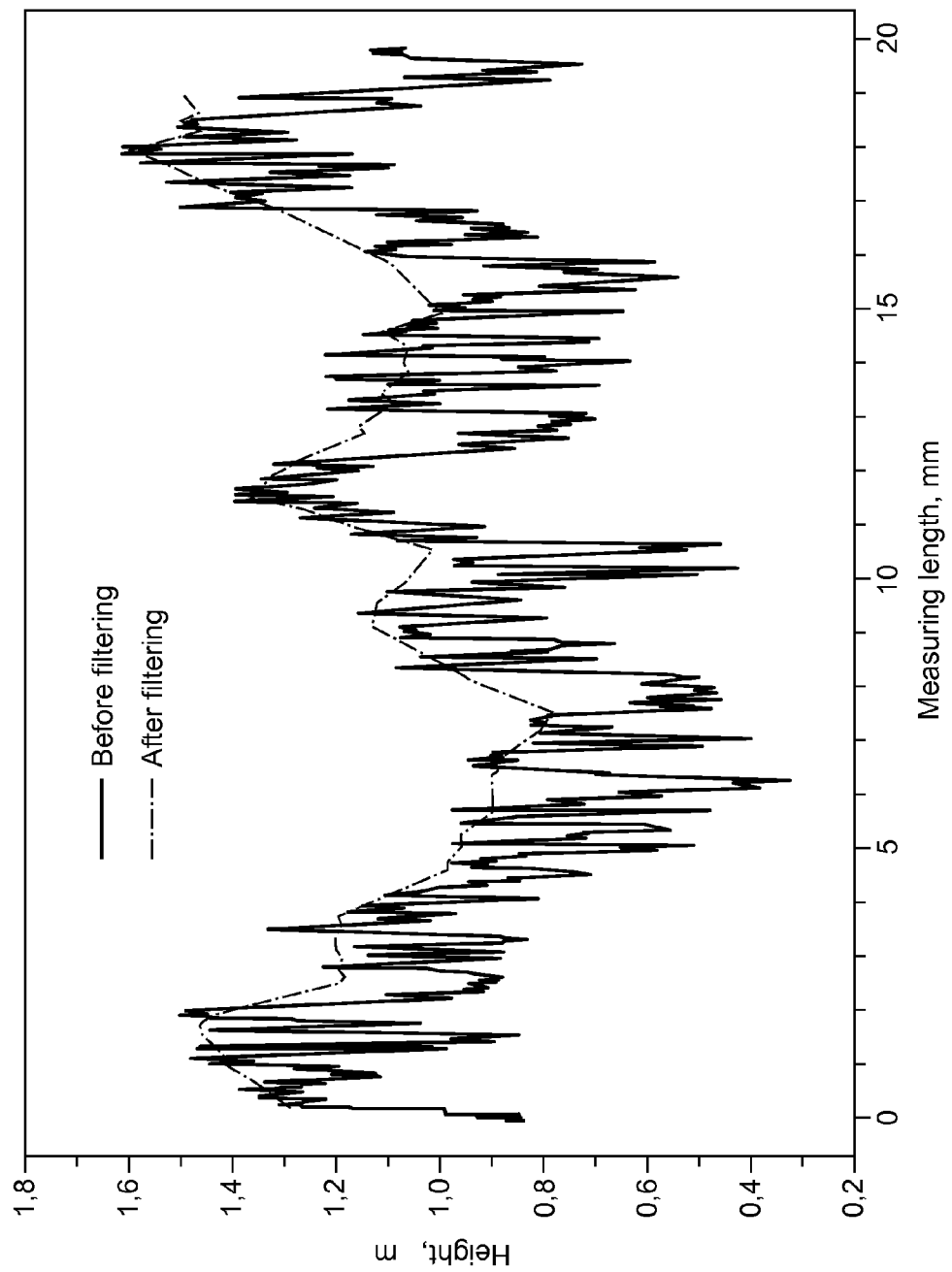
FIG. 2 is a graphic representation of the recorded measured values
Figure 3:
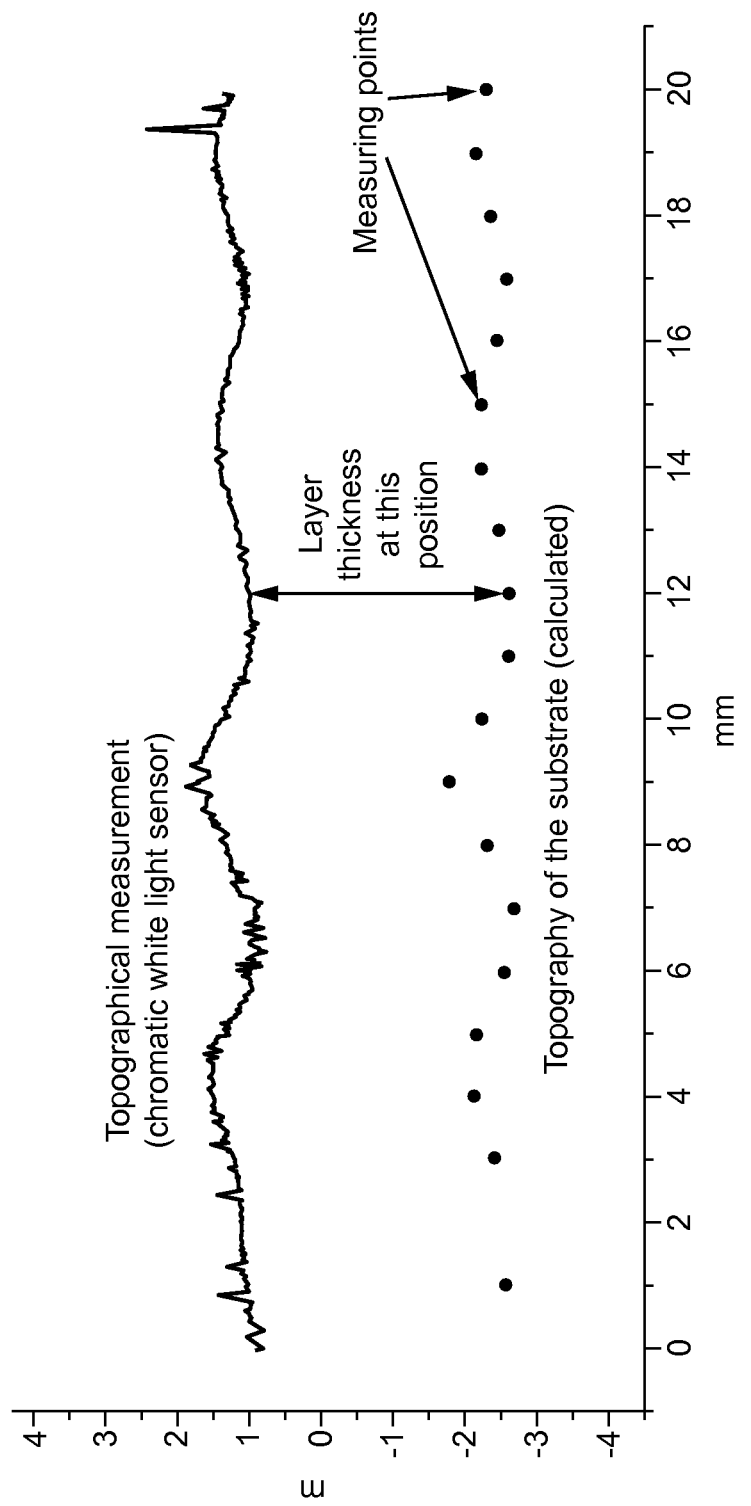
FIG. 3 is a graphic representation of the measured and calculated topography of the coating
Figure 4:
FIG. 4 is a schematic representation of the layer thickness and topography of the coating and of the substrate surface that have been determined

Three specimens, having dimensions of 10×10 cm², are produced from glass which is coated with a ~0.5 mm thick layer of polyethylene terephthalate (PET) foil. A cross-linkable polymer layer made from a bisphenol-A based epoxide was applied to each of these specimens.

These slit-die coated specimens, 1, 2 and 3, were subjected to layer thickness measurement using the layer thickness sensor (FTR). For each test specimen, layer thickness measurements were performed on three different profiles along the entire filtered section length of 20 mm. The distance between the film thickness measurements along the profile was 1 mm.

Profiling of the probe topography under the layer was made possible by subtracting each layer thickness value from the corresponding topographical height that had previously been measured by CWL.

A summary of the results is provided in Table 1.

No significant light interference was identified on specimens 1 and 2. For this reason, no digital soft filtering was applied. The surface topography was subsequently calculated using the mesotopography and microtopography and the weak light interference as layer surface reference.

Strong light interference was identified on specimen 3, which is why mathematical filtering was used. The surface topography of the coated surface was only calculated using the mesotopography. In this case the higher interference resulted from a thinner layer (see Table 1).

In all cases, in particular that of specimen 3, topographical conformity between the layer surface and the specimen was examined. Previously the topographical description had indicated that this surface is more even by comparison to specimens 1 and 2 ($S_{ku}3$, lower S, and higher total maxima in the imaged area).

By way of summary, on slit-die coated surfaces the layer surface and substrate are conformant. The substrate therefore governs the layer topography of the epoxy polymers. The smaller layer thickness on specimen 3 results in greater interference noise and consequently a higher standard deviation in thickness (107 nm). The greater layer thickness of specimens 1 and 2, on the other hand, results in less interference noise and a lower standard deviation in thickness (33 to 40 nm in each case). In the case of slit-die coated substrates, the epoxy polymer film displays physical and chemical uniformity.

TABLE 1

| Specimen | Layer thickness nm | Standard deviation nm | Topographical field | Uniformity |
|---|---|---|---|---|
| 1 | 3637 | 33 | Meso + microtopography + light interference | Yes |
| 2 | 3535 | 40 | Meso + microtopography + light interference | Yes |
| 3 | 1402 | 107 | Mesotopography | Yes |

List of Reference Numerals

1 Measuring table
2 Specimen
3 CWL sensor
4 Interferometer
5 Measured value evaluation/spectrograph
6 Measured value evaluation/spectrograph
7 Computer

The invention claimed is:

1. A method for determining the surface topography of a substrate underlying a coating, comprising:
   determining a three-dimensional topography of the coating on the substrate using chromatic white light measurement by making surface height measurements at x-y coordinates,
   determining the thickness of the coating at said x-y coordinates by making coating thickness measurements at said x-y coordinates using UV interferometry, and
   determining the surface topography of the substrate from results of said surface height measurements and said coating thickness measurements.

2. The method according to claim 1, wherein the substrate is a glass or polymer substrate, and the coating is a metal coating.

3. The method according to claim 1, wherein the coating comprises a non-crosslinked or crosslinked polymer layer.

4. The method according to claim 3, wherein the coating comprises a bisphenol-A based epoxide&, polystyrene or polymethyl methacrylate.

5. An apparatus for determining the surface topography of a substrate surface underlying a coating, comprising:
   a surface height measurement apparatus for making chromatic white light measurements of a surface height of said coating at x-y coordinates, and
   a thickness measurement apparatus for making UV interferometry measurements of the thickness of said coating at said x-y coordinates, wherein said surface height measurement apparatus and said thickness measurement apparatus are both located at one measurement station.

6. The method according to claim 1, wherein said surface height and layer thickness measurements are made using respective sensors at one measurement station.

7. The apparatus according to claim 5, wherein said surface height measurement apparatus is a confocal scanning apparatus.

* * * * *